(12) United States Patent
Kim et al.

(10) Patent No.: US 10,772,134 B2
(45) Date of Patent: Sep. 8, 2020

(54) METHOD OF TRANSMITTING AND RECEIVING SIGNAL AND APPARATUS SUPPORTING THE SAME IN A WIRELESS COMMUNICATION SYSTEM

(71) Applicant: LG Electronics Inc., Seoul (KR)

(72) Inventors: Youngtae Kim, Seoul (KR); Hyunsoo Ko, Seoul (KR); Hyangsun You, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/690,746

(22) Filed: Nov. 21, 2019

(65) Prior Publication Data
US 2020/0229237 A1 Jul. 16, 2020

Related U.S. Application Data

(63) Continuation of application No. PCT/KR2019/012491, filed on Sep. 26, 2019.
(Continued)

(30) Foreign Application Priority Data

Feb. 15, 2019 (KR) .................. 10-2019-0018259

(51) Int. Cl.
*H04W 72/12* (2009.01)
*H04W 74/08* (2009.01)

(52) U.S. Cl.
CPC .............................. *H04W 74/0833* (2013.01)

(58) Field of Classification Search
CPC . H04W 72/1273; H04W 76/12; H04W 48/12; H04W 84/18; H04W 56/005;
(Continued)

(56) References Cited

U.S. PATENT DOCUMENTS

2019/0110266 A1* 4/2019 Abedini ............ H04W 56/0015
2019/0124696 A1* 4/2019 Islam .................... H04W 76/10
(Continued)

FOREIGN PATENT DOCUMENTS

KR    20160123096    10/2016
WO    WO2012115352    8/2012
(Continued)

OTHER PUBLICATIONS

Qualcomm Incorporated, "Enhancements to support NR backhaul links," R1-1804835, 3GPP TSG RAN WG1 Meeting #92bis, Sanya, China, dated Apr. 16-20, 2018, 9 pages.

*Primary Examiner* — Jung Liu
(74) *Attorney, Agent, or Firm* — Fish & Richardson P.C.

(57) ABSTRACT

The present disclosure relates to a wireless communication system. Particularly, a communication method and an apparatus for the same are provided, in which configuration information related to random access of a user equipment (UE) is received from an upper node, first time resource information related to random access of the relay node is received from the upper node, and random access is performed to the upper node based on the configuration information and the first time resource information. The configuration information includes second time resource information including a periodicity of the random access of the UE and a plurality of random access occasions within the periodicity, and the first time resource information and the second time resource information do not overlap with each other in time resources.

13 Claims, 17 Drawing Sheets

Related U.S. Application Data

(60) Provisional application No. 62/791,460, filed on Jan. 11, 2019.

(58) Field of Classification Search
CPC ........... H04W 74/0833; H04W 92/045; H04W 80/02; H04W 72/0446; H04B 7/15507; H04B 7/15528
See application file for complete search history.

(56) References Cited

U.S. PATENT DOCUMENTS

| | | | |
|---|---|---|---|
| 2019/0289502 A1* | 9/2019 | Abedini | H04W 72/1231 |
| 2019/0306846 A1* | 10/2019 | Luo | H04W 72/0413 |
| 2019/0313433 A1* | 10/2019 | Abedini | H04B 7/155 |
| 2019/0342904 A1* | 11/2019 | Islam | H04B 7/15528 |
| 2019/0349061 A1* | 11/2019 | Cirik | H04L 1/1858 |
| 2019/0349079 A1* | 11/2019 | Novlan | H04W 72/1263 |
| 2019/0394738 A1* | 12/2019 | Abedini | H04W 74/0833 |
| 2020/0015180 A1* | 1/2020 | Islam | H04W 56/005 |

FOREIGN PATENT DOCUMENTS

| | | |
|---|---|---|
| WO | WO2018008916 | 1/2018 |
| WO | WO2018083662 | 5/2018 |

* cited by examiner

FIG. 1
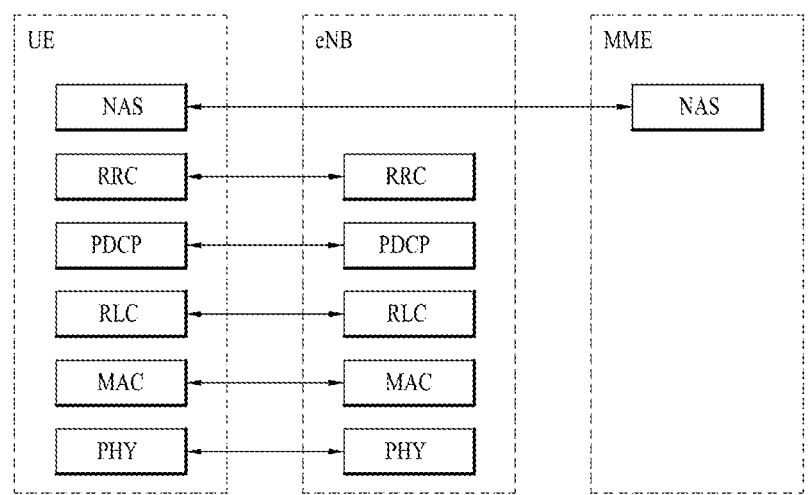
(A) CONTROL-PLANE PROTOCOL STACK
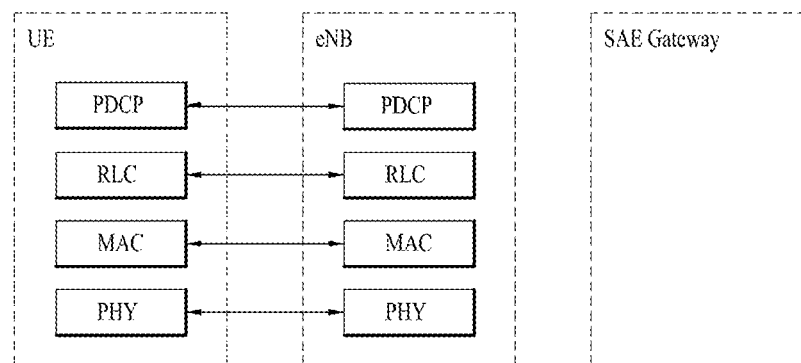
(B) USER-PLANE PROTOCOL STACK FIG. 11
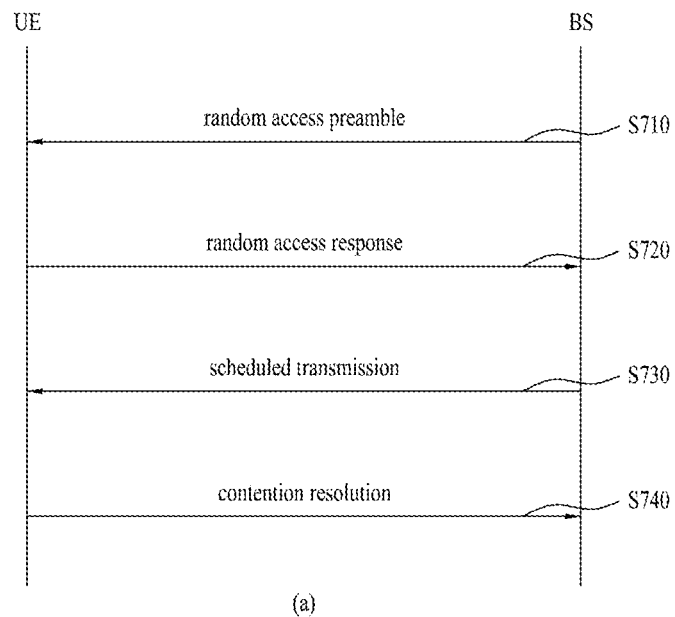
(a)
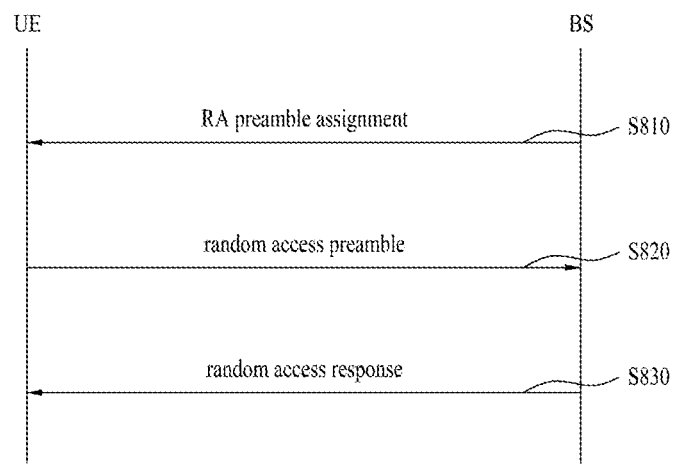
(b)

METHOD OF TRANSMITTING AND RECEIVING SIGNAL AND APPARATUS SUPPORTING THE SAME IN A WIRELESS COMMUNICATION SYSTEM

CROSS-REFERENCE TO RELATED APPLICATIONS

This application is a continuation of International Application No. PCT/KR2019/012491, filed on Sep. 26, 2019, which claims the benefit of Korean Application No. 10-2019-0018259, filed on Feb. 15, 2019, and U.S. Provisional Application No. 62/791,460, filed on Jan. 11, 2019. The disclosures of the prior applications are incorporated by reference in their entirety.

TECHNICAL FIELD

The present disclosure relates to a method and apparatus used in a wireless communication system, and more particularly, to a method and apparatus for transmitting and receiving a signal in the next-generation communication system.

BACKGROUND ART

The necessity for mobile broadband communication more improved than the conventional radio access technology (RAT) has increased as a number of communication devices has required higher communication capacity. In addition, massive machine type communications (MTC) capable of providing various services anytime and anywhere by connecting a number of devices or things to each other has been considered as a main issue in the next generation communications. Moreover, a communication system design capable of supporting services sensitive to reliability and latency has been discussed. The introduction of next-generation RAT considering enhanced mobile broadband communication (eMBB), massive MTC (mMTC), ultra-reliable and low-latency communication (URLLC), etc. has been discussed. In the present disclosure, the corresponding technology is referred to as new radio access technology (NR), for convenience of description.

DISCLOSURE

Technical Problem

An aspect of the present disclosure is to provide a method and apparatus for transmitting and receiving a signal in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method and apparatus for transmitting and receiving a signal in a wireless communication system.

In an aspect of the present disclosure, a communication method of a relay node in a wireless communication system includes receiving configuration information related to random access of a user equipment (UE) from an upper node, receiving first time resource information related to random access of the relay node from the upper node, and performing random access to the upper node based on the configuration information and the first time resource information. The configuration information includes second time resource information including a periodicity of the random access of the UE and a plurality of random access occasions within the periodicity, and the first time resource information and the second time resource information do not overlap with each other in time resources.

In an aspect of the present disclosure, a relay node used in a wireless communication system includes a memory and a processor. The processor is configured to receive configuration information related to random access of a UE from an upper node, receive first time resource information related to random access of the relay node from the upper node, and perform random access to the upper node based on the configuration information and the first time resource information. The configuration information includes second time resource information including a periodicity of the random access of the UE and a plurality of random access occasions within the periodicity, and the first time resource information and the second time resource information do not overlap with each other in time resources.

The second time resource information may include a plurality of subframe numbers, and the first time resource information may include one subframe number different from the plurality of subframe numbers.

The first time resource information may include an offset, and the offset may be an integer setting a longer periodicity than the periodicity.

The configuration information may be received in remaining minimum system information (RMSI), and the RMSI may include a separate bit field for transmission of the first time resource information.

The upper node may be a donor base station or a parent node of the relay node.

The relay node may be an integrated access and backhaul (IAB) node.

Further, the relay node may include an autonomous driving vehicle.

The above aspects of the present disclosure are merely a part of preferred embodiments of the present disclosure. Various embodiments reflecting the technical features of the present disclosure could be derived and understood based on the following detailed description of the present disclosure by those skilled in the art.

Advantageous Effects

According to the embodiments of the present disclosure, time resources for initial access may be configured for a relay node (RN) in the next-generation communication system.

According to the embodiments of the present disclosure, time resources for initial access may be configured efficiently in consideration of mobility between an RN and a user equipment (UE) in the next-generation communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 1 is a diagram illustrating the architecture of control-plane and user-plane radio interface protocols between a user equipment (UE) and an evolved UMTS terrestrial radio access network (E-UTRAN) based on a $3^{rd}$ generation partnership project (3GPP) radio access network standard;

FIG. 11 is a diagram illustrating general random access procedures;

BEST MODE

Figure 2:
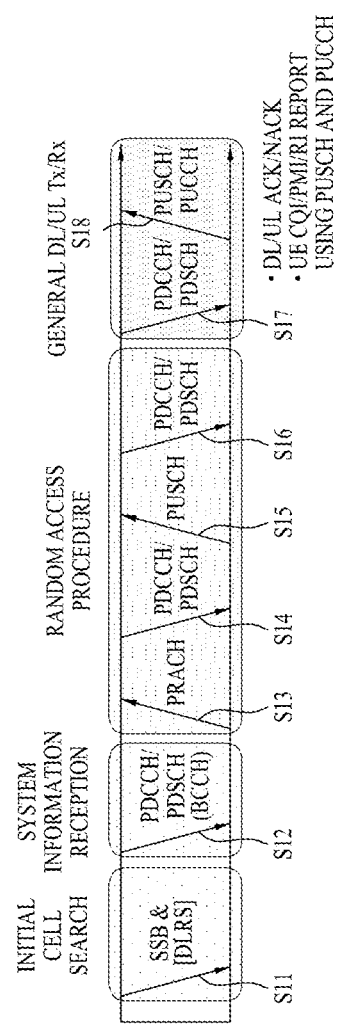
FIG. 2 is a diagram illustrating physical channels and a signal transmission method using the physical channels.

While embodiments of the present disclosure are described herein in the context of a long term evolution (LTE) system, an LTE-advanced (LTE-A) system, and a new radio access technology (NR) system, they are merely exemplary.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a mobile station (MS). The BS is a terminal node of a network, which communicates directly with an MS. In some cases, a specific operation described as performed by the BS may be performed by an upper node of the BS.

In the present disclosure, the term BS may be replaced with the term fixed station, Node B, evolved Node B (eNode B or eNB), gNode B (gNB), advanced base station (ABS), or access point. Further, the term BS may cover remote radio head (RRH), eNB, transmission point (TP), reception point (RP), and relay in its broad sense.

In the embodiments of the present disclosure, the term terminal may be replaced with the term user equipment (UE), MS, subscriber station (SS), mobile subscriber station (MSS), mobile terminal, or advanced mobile station (AMS).

A transmitter refers to a fixed node and/or a mobile node which provides data service or voice service, and a receiver refers to a fixed node and/or a mobile node which receives data service or voice service. On uplink (UL), therefore, an MS may serve as a transmitter and a BS may serve as a receiver, whereas on downlink (DL), the MS may serve as a receiver and the BS may server as a transmitter.

Techniques described herein may be used in various wireless access systems such as code division multiple access (CDMA), frequency division multiple access (FDMA), time division multiple access (TDMA), orthogonal frequency division multiple access (OFDMA), and single carrier-frequency division multiple access (SC-FDMA).

CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, and evolved-UTRA (E-UTRA). UTRA is a part of universal mobile telecommunications system (UMTS). $3^{rd}$ generation partnership project (3GPP) LTE is a part of Evolved UMTS (E-UMTS) using E-UTRA. 3GPP LTE employs OFDMA for DL and SC-FDMA for UL. LTE-A/LTE-A pro is an evolution of 3GPP LTE. 3GPP new radio or new radio access technology (NR) is an evolution of 3GPP LTE/LTE-A/LTE-A pro.

While embodiments of the present disclosure are described in the context of 3GPP communication systems (e.g., LTE and NR) for clarity, they are purely exemplary.

The 3GPP communication standards define DL physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNB and a UE. For example, cell specific RS, UE-specific RS (UE-RS), positioning RS (PRS), and channel state information RS (CSI-RS) are defined as DL RSs. The 3GPP LTE/LTE-A standards define UL physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and demodulation reference signal (DMRS) for a UL control/data signal, and sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, when it is said that a UE transmits a PUCCH/PUSCH/PRACH, this means that UCI/UL data/a random access signal is transmitted on or through the PUCCH/PUSCH/PRACH. Further, when it is said that a BS transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 is a diagram illustrating the architecture of control-plane and user-plane radio interface protocols between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

Layer 1 (i.e. L1) of the 3GPP LTE/LTE-A system is corresponding to a physical layer. A physical (PHY) layer of a first layer (Layer 1 or L1) provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an OFDMA scheme in DL and is modulated using a SC-FDMA scheme in UL.

Layer 2 (i.e. L2) of the 3GPP LTE/LTE-A system is split into the following sublayers: medium access control (MAC), radio link control (RLC), and packet data convergence protocol (PDCP). The MAC layer of a second layer (Layer 2 or L2) provides a service to an RLC layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

Layer 3 (i.e. L3) of the LTE/LTE-A system includes the following sublayers: radio resource control (RRC) and non-access stratum (NAS). An RRC layer located at the bottom of a third layer is defined only in the control plane. The RRC layer controls logical channels, transport channels, and physical channels in relation to configuration, re-configuration, and release of radio bearers. A radio bearer refers to a service that the second layer provides for data transmission between the UE and the E-UTRAN. To this end, the RRC layer of the UE and the RRC layer of the E-UTRAN exchange RRC messages with each other. The non-access stratum (NAS) layer positioned over the RRC layer performs functions such as session management and mobility management.

DL transport channels for transmission of data from the E-UTRAN to the UE include a broadcast channel (BCH) for transmission of system information, a paging channel (PCH) for transmission of paging messages, and a DL shared channel (SCH) for transmission of user traffic or control messages. Traffic or control messages of a DL multicast or broadcast service may be transmitted through the DL SCH and may also be transmitted through a separate DL multicast channel (MCH). Uplink transport channels for transmission of data from the UE to the network include a random access channel (RACH) for transmission of initial control messages and an UL SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 2 illustrates physical channels and a general signal transmission method using the physical channels in a 3GPP system.

In a wireless communication system, a UE receives information from a BS on DL and transmits information to the BS on UL. Information transmitted and received between the BS and the UE includes data and various types of control information, and there are various physical channels according to the types/usages of the transmitted and received information.

When a UE is powered on or enters a new cell, the UE performs initial cell search including acquisition of synchronization with a BS (S11). For the initial cell search, the UE may receive a PSS, an SSS, and a PBCH in a synchronization signal block (SSB) from the BS. The UE acquires synchronization with the BS and information such as a cell identity (ID) by receiving the PSS and the SSS. Further, the UE may acquire broadcast information within a cell by receiving the PBCH from the BS. Further, the UE may check a DL channel state by receiving a DL RS during the initial cell search.

After the initial cell search, the UE may acquire more detailed system information by receiving a PDCCH and receiving on a PDSCH corresponding to the PDCCH (S12).

Subsequently, to complete the connection to the BS, the UE may perform a random access procedure with the BS (S13 to S16). In the random access procedure, the UE may transmit a preamble on a PRACH (S13) and receive a PDCCH and a random access response (RAR) for the preamble on a PDSCH corresponding to the PDCCH (S14). The UE may then transmit a PUSCH based on scheduling information included in the RAR (S15), and perform a contention resolution procedure including reception of a PDCCH and a PDSCH corresponding to the PDCCH (S16).

After the above procedure, the UE may receive a PDCCH and/or a PDSCH from the BS (S17) and transmit a PUSCH and/or a PUCCH to the BS (S18), in a general UL/DL signal transmission procedure. Control information that the UE transmits to the BS is generically called UCI. The UCI includes a hybrid automatic repeat and request acknowledgement/negative acknowledgement (HARQ-ACK/NACK), a scheduling request (SR), and channel state information (CSI). The CSI includes a channel quality indicator (CQI), a precoding matrix index (PMI), a rank indicator (RI), and so on. In general, UCI is transmitted on a PUCCH. However, when control information and traffic data should be transmitted simultaneously, the control information and traffic data may be transmitted on a PUSCH. In addition, the UE may transmit the UCI aperiodically on the PUSCH, upon receipt of a request/command from a network.

Figure 3:
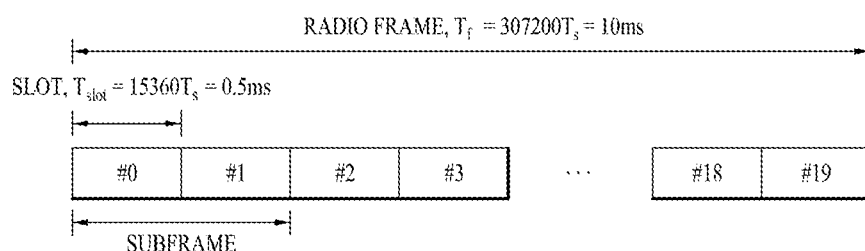
FIG. 3 is a diagram illustrating radio frame structures in a long term evolution (LTE) system.

FIG. 3 is a diagram illustrating exemplary radio frame structures in an LTE system.

Referring to FIG. 3, a radio frame is 10 ms (327200×Ts) long and divided into 10 equal-sized subframes. Each subframe is 1ms long and further divided into two slots. Each slot is 0.5 ms (15360×Ts) long. Herein, Ts represents a sampling time and Ts=1/(15 kHz×2048)=3.2552×10$^{-8}$ (about 33 ns). A slot includes a plurality of OFDM symbols or SC-FDMA symbols in the time domain by a plurality of resource blocks (RBs) in the frequency domain. In the LTE system, one RB includes 12 subcarriers by 7 (or 6) OFDM symbols. A unit time during which data is transmitted is defined as a transmission time interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 4:
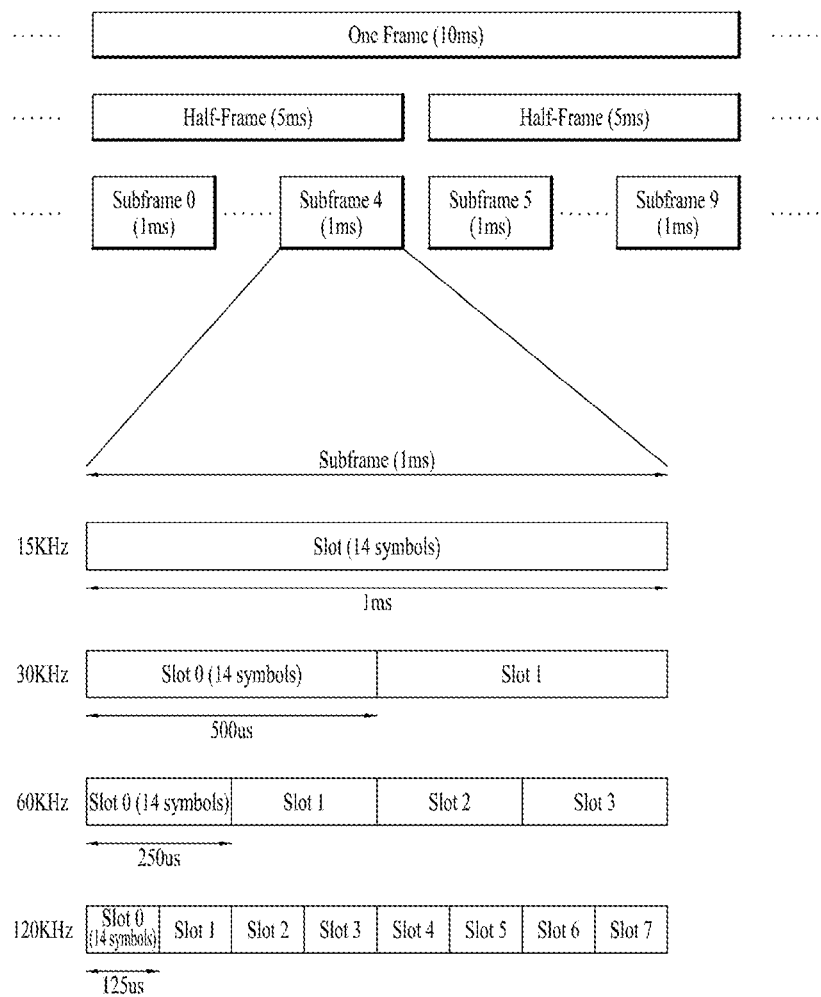
FIG. 4 is a diagram illustrating a radio frame structure in a new radio access technology (NR) system.

FIG. 4 is a diagram illustrating a radio frame structure in NR.

In the NR system, UL and DL transmissions are performed in frames. One radio frame is 10 ms in duration, defined by two 5-ms half-frames. One half-frame is defined by five 1-ms subframes. One subframe is divided into one or more slots, and the number of slots in a subframe depends on a subcarrier spacing (SCS). Each slot includes 12 or 14 OFDM(A) symbols according to a cyclic prefix (CP). Each slot includes 14 symbols in a normal CP case, and 12 symbols in an extended CP case. Herein, a symbol may include an OFDM symbol (or a CP-OFDM symbol) and an SC-FDMA symbol (or a discrete Fourier transform-spread-orthogonal frequency division multiplexing (DFT-s-OFDM) symbol).

In the NR system, different OFDM(A) numerologies (e.g., SCSs, CP lengths, and so on) may be configured for a plurality of cells aggregated for a UE. Therefore, the (absolute) duration of a time resource (e.g., a subframe, slot, or TTI) (for the convenience of description, generically referred to as a time unit (TU)) including the same number of symbols may be different between the aggregated cells.

Figure 5:
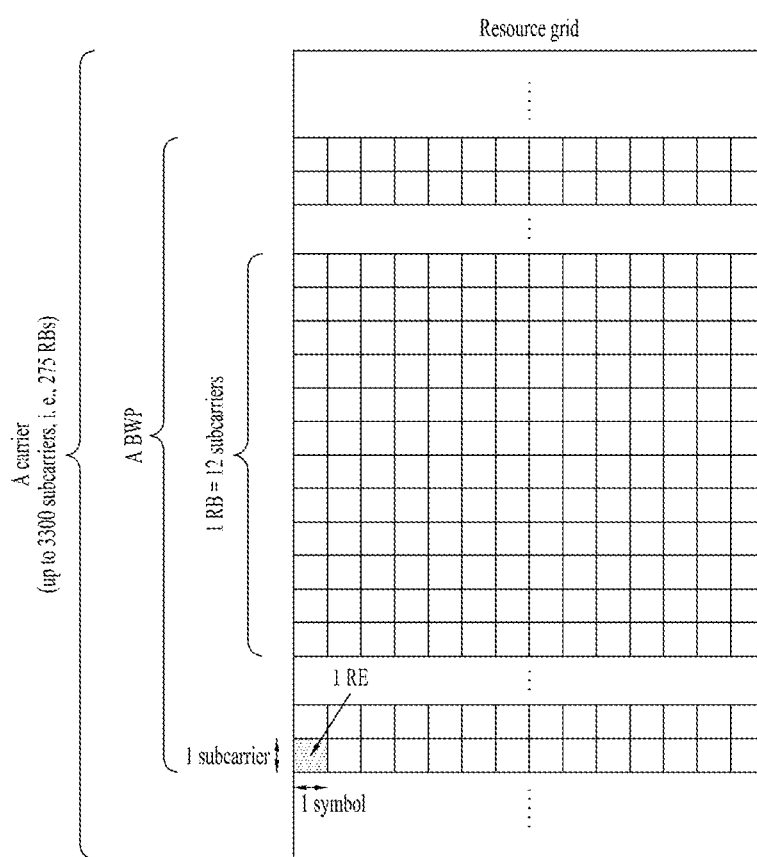
FIG. 5 is a diagram illustrating a slot structure in the NR system.

FIG. 5 is a diagram illustrating a slot structure in the NR system. One slot includes a plurality of symbols in the time domain. For example, one slot includes 14 symbols in a normal CP case and 12 symbols in an extended CP case. A carrier includes a plurality of subcarriers in the frequency domain. An RB is defined by a plurality of (e.g., 12) consecutive subcarriers in the frequency domain. A bandwidth part (BWP), which is defined by a plurality of consecutive (P)RBs in the frequency domain, may correspond to one numerology (e.g., SCS, CP length, and so on). A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 6:
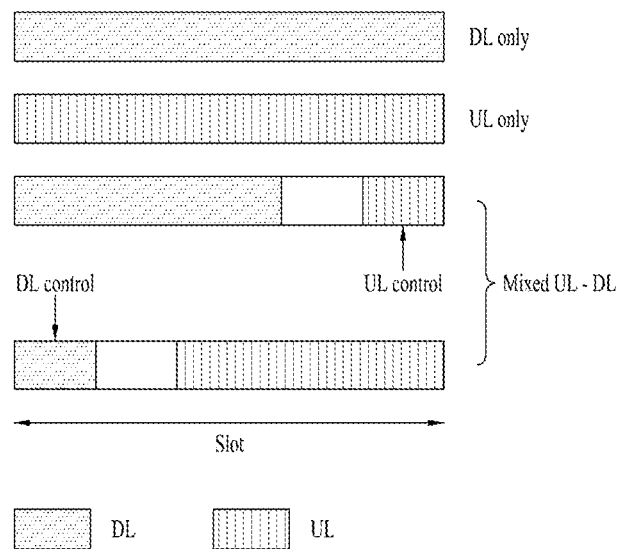
FIG. 6 is a diagram illustrating self-contained slot structures in the NR system.

FIG. 6 is a diagram illustrating self-contained slot structures in the NR system.

In the NR system, a frame is characterized by a self-contained structure in which all of a DL control channel, DL or UL data, and a UL control channel may be included in one slot. For example, the first N symbols (referred to as a DL control region) of a slot may be used to carry a DL control channel, and the last M symbols (referred to as a UL control region) of the slot may be used to carry a UL control channel. Each of N and M is an integer equal to or larger than 0. A resource area (referred to as a data region) between the DL control region and the UL control region may be used for DL data transmission or UL data transmission. A time gap for DL-to-UL or UL-to-DL switching may exist between each control region and the data region. For example, the following configurations may be considered. Each period is arranged in time order.

1. DL only configuration
2. UL only configuration
3. Mixed UL-DL configuration
   DL region+GP (guard period)+UL control region
   DL control region+GP+UL region DL region: (i) DL data region, (ii) DL control region+DL data region UL region: (i) UL data region, (ii) UL data region+UL control region A PDCCH may be transmitted in the DL control region, and a PDSCH may be transmitted in the DL data region. A PUCCH may be transmitted in the UL control region, and a PUSCH may be transmitted in the UL data region. The PDCCH may deliver DCI, for example, DL data scheduling information and UL data scheduling information. The PUCCH may deliver UCI, for example, an ACK/NACK for DL data, CSI, and an SR. The GP provides a time gap during which a BS and a UE transition from a transmission mode to a reception mode or from the reception mode to the transmission mode. Some symbols at the time of DL-to-UL switching in a subframe may be configured as a GP.

To transmit data in a wide frequency band, while maintaining a high transmission rate for multiple users, the use of an ultra-high frequency band, that is, a millimeter frequency band at or above 6 GHz is considered in the NR system. The technique is called NR in the 3GPP, while it is referred to as an NR system in the present disclosure. However, the millimeter frequency band exhibits the frequency property that a signal is very rapidly attenuated according to a distance due to the use of too high a frequency band. Therefore, the NR system using a band at or above at least 6 GHz adopts a narrow beam transmission scheme in which a signal is transmitted with energy concentrated in a specific direction, not omni-directionally to compensate for rapid propagation attenuation and thus overcome coverage reduction caused by the rapid propagation attenuation. However, because one BS services a narrow range by one narrow beam alone, the BS covers a wideband with multiple narrow beams.

In a millimeter frequency band, that is, a millimeter wave (mmW) band, a wavelength is short, which enables installation of multiple antenna elements over the same area. For example, a total of 100 antenna elements may be installed in a two-dimensional array on a 5*5 cm panel at intervals of 0.5 lambda (wavelength) in a 30 GHz band with a wavelength of about 1 cm. In the mmW system, therefore, to enhance coverage or increase throughput by increasing a beamforming gain using multiple antenna elements is under consideration.

To form a narrow beam in the millimeter frequency band, a beamforming scheme is mainly considered, in which energy is increased only in a specific direction by transmitting the same signal with appropriate phase differences through a large number of antennas at a BS or a UE. Such beamforming schemes include digital beamforming which generates a phase difference in a digital baseband signal, analog beamforming which generates a phase difference in a modulated analog signal based on a time delay (i.e., a cyclic shift), and hybrid beamforming using both digital beamforming and analog beamforming. The use of a transceiver unit (TXRU) per antenna element to enable transmission power control and phase control on an antenna element basis may lead to independent beamforming in each frequency resource. However, installation of TXRUs for all of about 100 antenna elements is not viable in terms of cost effectiveness. That is, because multiple antennas are to be used to compensate for rapid propagation attenuation in the millimeter frequency band, and digital beamforming requires as many radio frequency (RF) components (e.g., digital-to-analog converters (DACs), mixers, power amplifiers, and linear amplifiers) as the number of antennas, implementation of digital beamforming in the millimeter frequency band increases the prices of communication devices. Accordingly, when a large number of antennas are required as is the case with the millimeter frequency band, analog beamforming or hybrid beamforming is considered. In analog beamforming, multiple antenna elements are mapped to one TXRU and the direction of a beam is controlled by an analog phase shifter. Because only one beam direction is generated across a total band in analog beamforming, frequency selective beamforming is not possible. Hybrid beamforming is an intermediate scheme between digital beamforming and analog beamforming, in which there are B TXRUs fewer than Q antenna elements. Although there are differences depending on how the B TXRUs are connected to the Q antenna elements, the number of the directions of beams which may be simultaneously transmitted is limited to B or less in hybrid beamforming.

As described before, because a transmission or received digital baseband signal is subjected to signal processing in digital beamforming, the signal may be transmitted or received simultaneously in multiple directions by multiple beams. Compared to digital beamforming, a transmission or received analog signal is subjected to beamforming in a modulated state in analog beamforming. Therefore, the signal may not be transmitted or received simultaneously in multiple directions outside a range covered by one beam. In general, a BS communicates with multiple users at the same time through wideband transmission or based on a multi-antenna property. When the BS forms an analog beam in one beam direction in analog beamforming or hybrid beamforming, the BS communicates only with users within the same analog beam direction in view of the nature of analog beamforming. A method of allocating RACH resources and using BS resources according to the present disclosure is proposed in consideration of limitations inherent to analog beamforming or hybrid beamforming.

Figure 7:
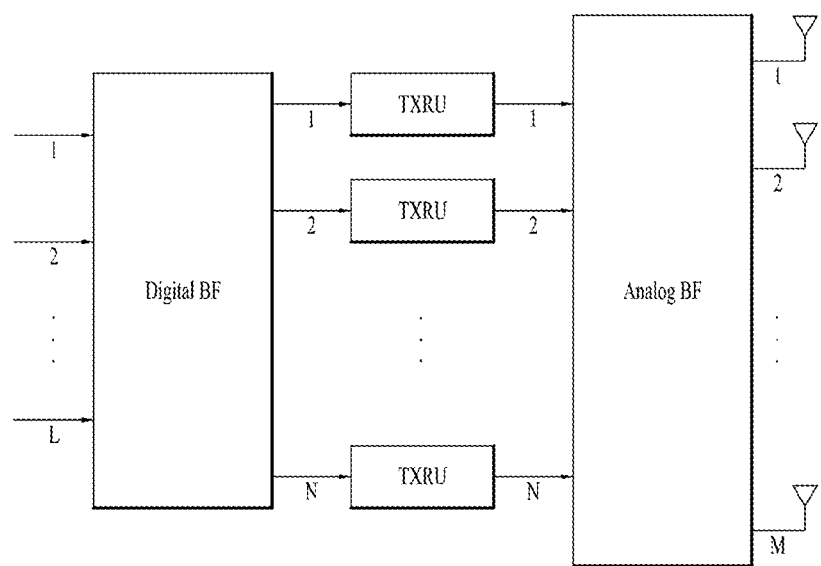
FIG. 7 is a diagram illustrating a hybrid beamforming structure from the perspective of transceiver units (TXRUs) and physical antennas.

FIG. 7 is a diagram illustrating a hybrid beamforming structure from the perspective of TXRUs and physical antennas.

Along with the use of multiple antennas, a hybrid beamforming scheme with digital beamforming and analog beamforming combined has been introduced. Analog beamforming (or RF beamforming) is an operation of performing precoding (or combining) at a transceiver (or RF unit). In hybrid beamforming, each of a baseband unit and a transceiver (or RF unit) performs precoding (or combining), thereby achieving performance approaching that of digital beamforming, with reduced numbers of RF chains and DACs (or analog-to-digital converters (ADCs)). For the convenience's sake, a hybrid beamforming structure may be represented by N TXRUs and M physical antennas. Digital beamforming for L data layers to be transmitted from a transmitter may be represented as an N-by-L matrix. Then, N digital signals are converted to analog signals through the TXRUs and subjected to analog beamforming represented as an M-by-N matrix.

In FIG. 7, the number of digital beams is L and the number of analog beams is N. The NR system seeks to support more efficient beamforming to a UE located in a specific area by designing a BS to change analog beamforming on a symbol basis. With one antenna panel defined by N TXRUs and M RF antennas, the introduction of a plurality of antenna panels to which independent hybrid beamforming is applicable is further under consideration in the NR system. As such, when the BS uses a plurality of analog beams, each UE may have a different analog beam suitable for signal reception. Accordingly, a beam sweeping operation is under consideration, in which a BS changes a plurality of analog beams to be applied on a symbol basis in a specific slot or subframe, for at least a synchronization signal, system information, paging, and so on, so that all UEs may have reception opportunities.

Figure 8:
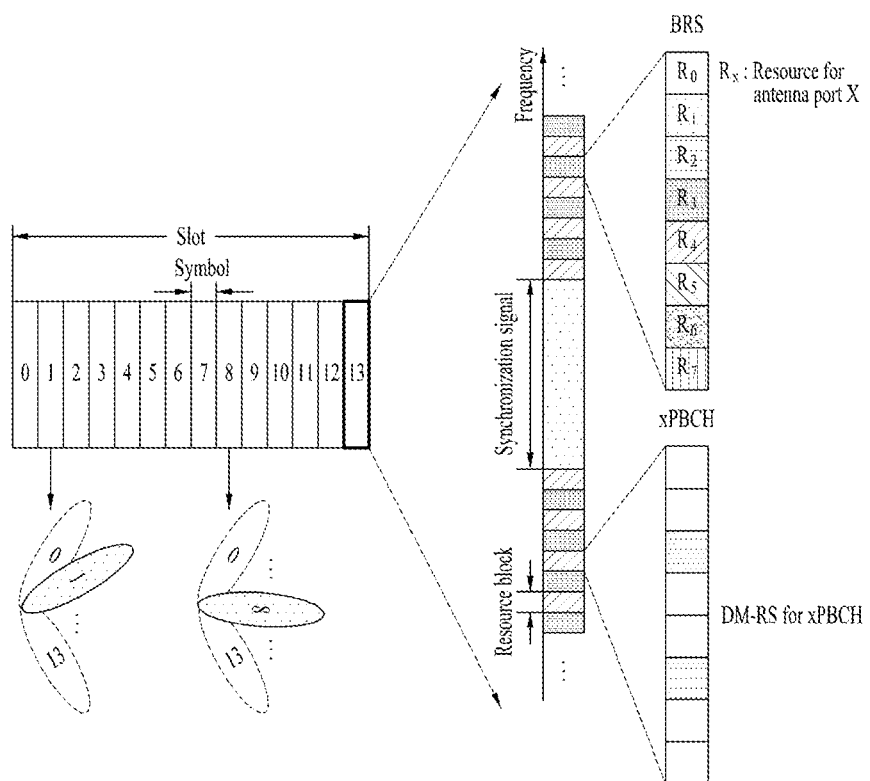
FIG. 8 is a diagram illustrating a beam sweeping operation for a synchronization signal and system information in a downlink transmission procedure.

FIG. 8 is a schematic diagram illustrating a beam sweeping operation for a synchronization signal and system information in a DL transmission procedure A physical resource (or physical channel) carrying system information in the NR system to which the present disclosure is applicable is referred to as an xPBCH. Analog beams from different antenna panels may be simultaneously transmitted in one symbol. As illustrated in FIG. 8, the introduction of a beam RS (BRS), an RS transmitted for a single analog beam corresponding to a specific antenna panel is under discussion to measure a channel for each analog beam. The BRS may be defined for a plurality of antenna ports, and each antenna port of the BRS may correspond to a single analog beam. Unlike the BRS, a synchronization signal or the xPBCH may be transmitted for all analog beams in an analog beam group, such that any UE may receive the signal successfully.

Figure 9:
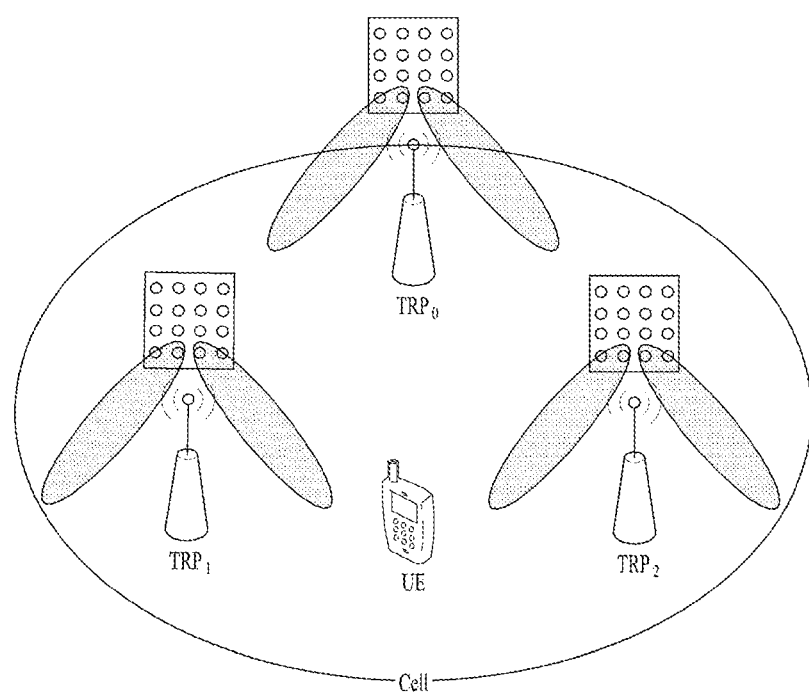
FIG. 9 is a diagram illustrating an exemplary cell in the NR system.

FIG. 9 illustrates an exemplary cell in the NR system.

Referring to FIG. 9, compared to a wireless communication system such as the legacy LTE system in which one BS covers one cell, configuring one cell with a plurality of transmission and reception points (TRPs) is under discussion in the NR system. When a plurality of TRPs cover one cell, seamless communication is possible and mobility management is facilitated for a UE, even though a TRP serving the UE is changed.

Compared to the LTE/LTE-A system in which the PSS/SSS is transmitted omni-directionally, a method of transmitting a signal such as a PSS/SSS/PBCH by beamforming, while sweeping beams in all beam directions at a gNB using mmWave is under consideration. This transmission/reception of a signal by sweeping beams in beam directions is referred to as beam sweeping or beam scanning. In the present disclosure, "beam sweeping" is a transmitter behavior, and "beam scanning" is a receiver behavior. For example, given up to N beam directions, the gNB transmits a signal such as a PSS/SSS/PBCH in each of the N beam directions. That is, the gNB transmits a synchronization signal such as the PSS/SSS/PBCH in each direction, while sweeping a beam in directions available to or supported by the gNB. Alternatively, when the gNB is capable of forming N beams, the gNB may group the beams into beam groups each including a few beams, and transmit/receive the PSS/SSS/PBCH on a beam group basis. One beam group includes one or more beams. The PSS/SSS/PBCH transmitted in the same direction may be defined as one SSB, and there may exist a plurality of SSBs within one cell. In the presence of a plurality of SSBs, SSB indexes may be used to distinguish the SSBs from each other. For example, when the PSS/SSS/PBCH is transmitted in 10 beam directions in a system, it may be understood that the PSS/SSS/PBCH transmitted in the same direction forms one SSB, and 10 SSBs exist in the system. In the present disclosure, a beam index may be interpreted as an SSB index.

An SSB includes an SS/PBCH block, and is transmitted periodically according to an SSB periodicity.

A UE may perform cell search, system information acquisition, beam alignment for initial access, and DL measurement based on an SSB. The term SSB is interchangeably used with SS/PBCH block.

An SSB includes a PSS, an SSS, and a PBCH. The SSB includes four consecutive OFDM symbols, which carry the PSS, PBCH, SSS/PBCH, and PBCH, respectively. Each of the PSS and the SSS includes one OFDM symbol by 127 subcarriers, and the PBCH includes three OFDM symbols by 576 subcarriers. Polar coding and quadrature phase shift keying (QPSK) are applied to the PBCH. The PBCH includes data REs and DMRS REs in each OFDM symbol. There are three DMRS REs per RB, with three data REs between every two adjacent DMRS REs.

Cell search is a process of acquiring time/frequency synchronization with a cell and detecting the cell ID (e.g., physical layer cell ID (PCID)) of the cell at a UE. The PSS is used to detect a cell ID in a cell ID group, and the SSS is used to detect the cell ID group. The PBCH is used to detect an SSB (time) index and a half-frame.

The cell search procedure of the UE may be summarized as illustrated in Table 1 below.

TABLE 1

| Type of Signals | | Operations |
|---|---|---|
| $1^{st}$ step | PSS | * SS/PBCH block (SSB) symbol timing acquisition |
| | | * Cell ID detection within a cell ID group (3 hypothesis) |
| $2^{nd}$ Step | SSS | * Cell ID group detection (336 hypothesis) |
| $3^{rd}$ Step | PBCH DMRS | * SSB index and Half frame (HF) index (Slot and frame boundary detection) |
| $4^{th}$ Step | PBCH | * Time information (80 ms, System Frame Number (SFN), SSB index, HF) |
| | | * Remaining Minimum System Information (RMSI) Control resource set (CORESET)/Search space configuration |
| $5^{th}$ Step | PDCCH and PDSCH | * Cell access information |
| | | * RACH configuration |

There are 336 cell ID groups, each including three cell IDs. Thus, a total of 1008 cell IDs exist.

The UE may perform a network access procedure to implement procedures and/or methods described/proposed in the present disclosure. For example, the UE may receive system information and configuration information required to perform the later-described/proposed procedures and/or methods and store the received system information and configuration information in a memory, during access to a network (e.g., a BS). The required configuration information of the present disclosure may be received by higher-layer signaling (e.g., RRC signaling or MAC signaling).

Figure 10:
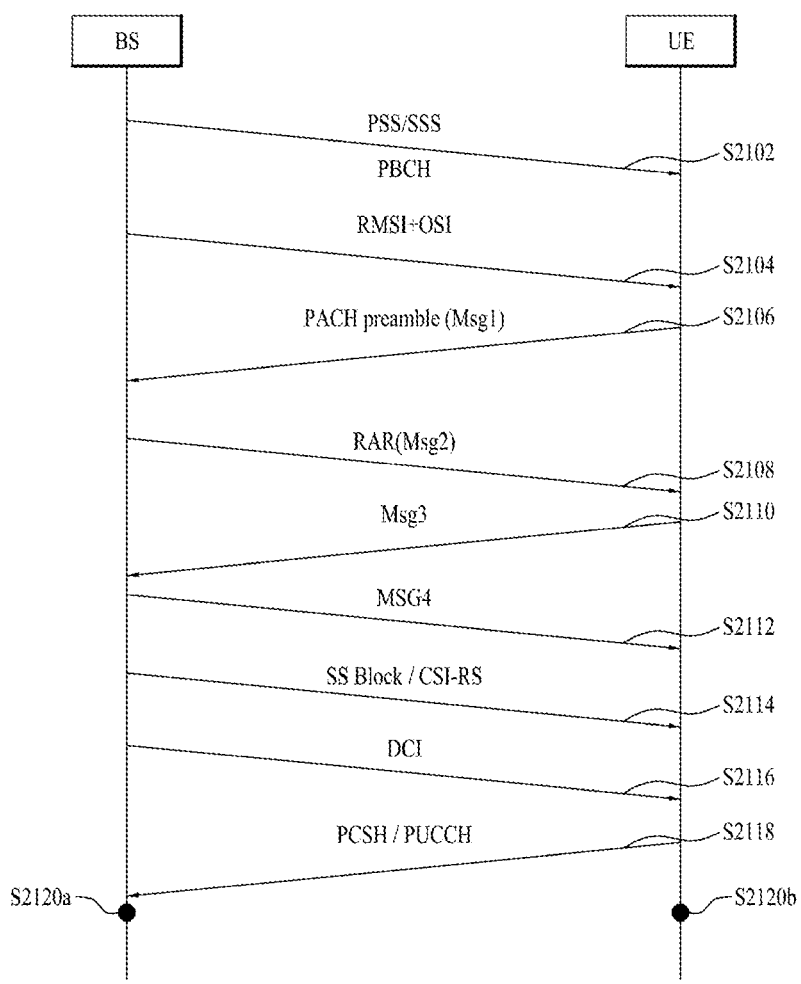
FIG. 10 is a diagram illustrating a signal flow for a procedure for network initial access and subsequent communication.

FIG. 10 illustrates an exemplary procedure for network initial access and subsequent communication. In NR, a physical channel and an RS may be transmitted by beamforming. When beamforming-based signal transmission is supported, a beam management process may be performed for beam alignment between a BS and a UE. Further, a signal proposed by the present disclosure may be transmitted/received by beamforming. Beam alignment may be performed based on an SSB in RRC IDLE mode, and based on a CSI-RS (in DL) and an SRS (in UL) in RRC CONNECTED mode. When beamforming-based signal transmission is not supported, a beam-related operation may be skipped in the following description.

Referring to FIG. 10, a BS may transmit an SSB periodically (S2102). The SSB includes a PSS/SSS/PBCH. The SSB may be transmitted by beam sweeping. The BS may then transmit remaining minimum system information (RMSI) and other system information (OSI) (S2104). The RMSI may include information (e.g., PRACH configuration information) required for the UE to initially access the BS. After the SSB detection, the UE identifies a best SSB. The UE may then transmit an RACH preamble (Message 1 or Msg 1) in PRACH resources linked/corresponding to the index (i.e., beam) of the best SSB (S2106). The beam direction of the RACH preamble is associated with the PRACH resources. Association between PRACH resources (and/or RACH preambles) and SSBs (SSB indexes) may be configured by system information (e.g., RMSI). Subsequently, the BS may transmit a random access response (RAR) (Message 2 or Msg 2) in response to the RACH preamble in an RACH procedure (S2108). The UE may transmit Message 3 (Msg 3) (e.g., RRC Connection Request) based on a UL grant included in the RAR (S2110), and the BS may transmit a contention resolution message (Message 4 or Msg 4) (S2112). Msg 4 may include RRC Connection Setup. Msg 1 and Msg 3 may be combined and processed in one step (e.g., Msg A), and Msg 2 and Msg 4 may be combined and processed in one step (e.g., Msg B).

Once an RRC connection is established between the BS and the UE in the RACH procedure, beam alignment may be subsequently performed based on an SSB/CSI-RS (in DL) and an SRS (in UL). For example, the UE may receive the SSB/CSI-RS (S2114). The SSB/CSI-RS may be used for the UE to generate a beam/CSI report. The BS may request a beam/CSI report to the UE by DCI (S2116). The UE generates the beam/CSI report based on the SSB/CSI-RS and transmit the generated beam/CSI report to the BS on a PUSCH/PUCCH (S2118). The beam/CSI report may include information about a preferred beam as a result of beam measurement. The BS and the UE may switch beams based on the beam/CSI report (S2120a and S2120b).

Subsequently, the UE and the BS may perform the later-described/proposed procedures and/or methods. For example, the UE and the BS may transmit a radio signal by processing information stored in a memory, or process a received radio signal and store the processed radio signal in the memory based on configuration information obtained in the network access procedure (e.g., the system information acquisition process, the RACH-based RRC connection process, and so on) according to a proposal of the present disclosure. The radio signal may include at least one of a PDCCH, a PDSCH, or an RS in DL, and at least one of a PUCCH, a PUSCH, or an SRS in UL.

FIG. 11 illustrates general random access procedures.

A random access procedure is used for various purposes. For example, the random access procedure may be used for network initial access, handover, and UE-triggered UL data transmission. There are a contention-based random access procedure and a non-contention-based or dedicated random access procedure. The term random access procedure is interchangeably used with RACH procedure.

FIG. 11(a) illustrates an exemplary contention-based random access procedure.

Referring to FIG. 11(a), a UE receives information about random access in system information from a BS. When random access is required, the UE transmits a random access preamble (Msg 1) to the BS (S710). Upon receipt of the random access preamble from the UE, the BS transmits an RAR message (Msg 2) to the UE (S720). Specifically, scheduling information for the RAR message may be cyclic redundancy check (CRC)-masked by a random access-radio network temporary identity (RA-RNTI) and transmitted on an L1/L2 control channel (PDCCH). The PDCCH masked by the RA-RNTI may be transmitted only in a common search space. Upon receipt of the scheduling signal masked by the RA-RNTI, the UE may receive an RAR message on a PDSCH indicated by the scheduling information. The UE then checks whether the RAR message includes RAR information directed to the UE. The UE may determine the presence or absence of the RAR information directed to the UE by determining whether the random access preamble ID (RAID) of the transmitted preamble exists. The RAR information includes timing offset information (e.g., a timing advance command (TAC)) for UL synchronization, UL scheduling information (e.g., a UL grant), and UE temporary identification information (e.g., a temporary cell-RNTI (TC-RNTI)). Upon receipt of the RAR information, the UE transmits UL-SCH data (Msg 3) on a PUSCH according to UL scheduling information (S730). After receiving the UL-SCH data, the BS transmits a contention resolution message (Msg 4) to the UE (S740).

FIG. 11(b) illustrates a non-contention-based random access procedure. The non-contention-based random access procedure may be performed during handover or upon request by a command from a BS. The non-contention-based random access procedure is basically identical to the contention-based random access procedure.

Referring to FIG. 11(b), the UE is allocated a dedicated random access preamble by the BS (S810). Dedicated random access preamble indication information (e.g., a preamble index) may be received in an RRC message (e.g., handover command) or a PDCCH order. After the random access procedure is initiated, the UE transmits the dedicated random access preamble to the BS (S820). Subsequently, the UE receives an RAR from the BS (S830), and the random access procedure ends. A random access procedure in an SCell may be initiated only by a PDCCH order.

In NR, DCI format 1_0 is used to initiate the non-contention-based random access procedure by a PDCCH order. DCI format 1_0 is used to schedule a PDSCH in one DL cell. When the CRC of DCI format 1_0 is scrambled with a C-RNTI and the bits of a "frequency domain resource assignment" field are all 1s, DCI format 1_0 is used as the PDCCH order indicating the random access procedure. In this case, fields of DCI format 1_0 are configured as follows.

RA preamble index: 6 bits

UL/supplementary UL (SUL) indicator: 1 bit. When all bits of the RA preamble index are non-zeroes and the UE is configured with SUL in the cell, the UL/SUL indicator indicates a UL carrier in which a PRACH is transmitted in the cell. Otherwise, the UL/SUL indicator is reserved.

SSB index: 6 bits. When all bits of the RA preamble index are non-zeroes, the SSB index indicates an SSB used to determine an RACH occasion for PRACH transmission. Otherwise, the SSB index is reserved.

PRACH mask index: 4 bits. When all bits of the RA preamble index are non-zeroes, the PRACH mask index indicates an RACH occasion associated with the SSB indicated by the SSB index. Otherwise, the PRACH mask index is reserved.

Reserved: 10 bits.

When DCI format 1_0 is not a PDCCH order, DCI format 1_0 is configured with fields used to schedule a PDSCH (e.g., a time domain resource assignment, a modulation and coding scheme (MCS), an HARQ process number, a PDSCH-to-HARQ feedback timing indicator, and so on).

In the current standardization of 3GPP Rel. 16, NR, a relay BS is worked on in order to cover a coverage hole and reduce wired connections between gNBs. This is called an integrated access backhaul (IAB) in which a donor gNB (DgNB) transmits a signal to a UE via a relay gNB (relay node). The IAB includes a wireless backhaul link for communication between a DgNB and a relay gNB or between relay gNBs and an access link for communication between a DgNB and a UE or between a relay gNB and a UE.

The present disclosure relates to an RACH configuration for initial access of IAB nodes in an IAB scenario.

The standardization of the NR system is worked on based on the assumption that a node transmits an SSB or a CSI-RS on a backhaul link, for discovery. Each IAB node measures or discovers the SSB or the CSI-RS and feeds back a measured or discovered value to a parent node or donor node. (When an intermediate node is responsible for route selection, the parent node may transmit the discovered or measured feedback value to the intermediate node by relaying the feedback value. When the network is responsible for route selection for nodes that the network manages, the parent node may transmit the discovered or measured feedback value to the donor node by relaying the feedback value.) The network or the intermediate node determines a route based on feedback values.

Because Rel. 16 into which the NR system is standardized is based on the assumption of half-duplex which does not allow simultaneous transmission and reception for IAB nodes, this discovery operation faces the problem that SSBs or CSI-RSs from other nodes may not be measured or discovered during transmission of an SSB or a CSI-RS to be discovered. To avert the problem, there may be a need for multiplexing SSB or CSI-RS transmissions between nodes in time division multiplexing (TDM). For this purpose, a transmission pattern for the SSB or CSI-RS transmissions or a muting pattern for discontinuing an ongoing transmission and discovering or measuring discovery signals from other nodes may be required.

While the following description is given in the context of an in-band environment, the present disclosure may also be applied to an out-band environment. Further, while the following description is given in consideration of an environment in which a DgNB, a relay node (RN), and a UE perform a half-duplex operation, the present disclosure is also applicable to an environment in which a DgNB, an RN, and a UE perform a full duplex operation.

For the convenience of description in the present disclosure, when there are RN1 and RN2, and RN1 is connected to RN2 via a backhaul link and relays data transmitted and received by RN2, RN1 is referred to as a parent node of RN2 and RN2 is referred to as a child node of RN1.

Because an IAB node also has UE functionalities, the IAB node may operate like a UE, when communicating with a parent node.

When an IAB node operates like a UE, the IAB node needs to perform an initial access operation. For an RACH operation for initial access, an RACH configuration is transmitted in RMSI by one of SIB1 messages. In the standardization of Rel. 15, transmitting the same RACH configuration to all IAB nodes and UEs controlled by one DgNB based on an RACH configuration for an access UE may be considered to be the simplest method. Considering that the DgNB controls all RRC signals of IAB nodes, transmission of only one RACH configuration via a wireless backhaul advantageously reduces signaling overhead.

However, the above operation may cause the half-duplex problem between an IAB node and UEs connected to the IAB node. For example, when the IAB node and the UEs connected to the IAB node share the same RACH configuration, they may use the same RACH resources (e.g., time resources). When the IAB nodes is to transmit an RACH, there may be a UE which is also to transmit an RACH among the UEs connected to the IAB node. As a result, the half-duplex problem that the IAB node should receive an RACH while transmitting an RACH at one time is produced.

The RACH may be used for initial access, beam correction, and so on. RACH transmissions may not take place often on the part of IAB nodes which have no or little mobility. In this case, RACH resources for IAB nodes and RACH resources for UEs may be separated and a longer periodicity may be given to the RACH resources for IAB nodes, for efficient use of resources.

To separate the RACH resources for IAB nodes from the RACH resources for UEs in the time domain, it is efficient to separate only the RACH resources between the IAB nodes and the UEs, while an RACH configuration for the UEs is shared. The DgNB determines the RACH configuration for the UEs and transmits the RACH configuration to the IAB nodes by wireless relaying. It is assumed that the same RACH configuration for the UEs is used for the IAB nodes, and only information about the RACH resources for the IAB nodes is additionally signaled. For example, the RACH configuration for the UEs may be transmitted in RMSI, and the RMSI may include a bit field including separate time resource information for the IAB nodes.

While RACH resources basically include frequency resources and time resources, the RACH resources will be described below in the context of time resources for RACH implementation, by way of example.

RACH resources may be represented by an equation $n_{SFN} \bmod x = y$ and a subframe number. Herein, x represents an RACH periodicity, y represents a system frame number (SFN), and the subframe number indicates the position of a specific 1 ms (subframe) in a specific 10-ms frame.

Because an existing x value is limited to 1, 2, 4, 8, or 16, a larger value is required to allocate RACH resources with a longer periodicity to an IAB node. Although the periodicity may be increased by directly setting a periodicity x' for the IAB node and thus using an equation $n_{SFN} \bmod x' = y$, a large number of values may be required to directly set various periodicities.

As the number of UEs increases, more RACH occasions may be required for the UEs. Further, as more IAB nodes are installed, more RACH occasions may be required for the IAB nodes. Accordingly, it is efficient to set the periodicity of RACH resources for an IAB node relative to the periodicity of RACH resources for a UE. For example, on the assumption that $n_{SFN} \bmod 2^{x'} x = y$ is a value for the RACH resources of the IAB node, $2^{x'} x$ may be determined to be the periodicity of the RACH resources of the IAB node by setting x' for the IAB node in addition to x set for the RACH resources of the UE.

To overcome the half-duplex problem between an IAB node and a UE, RACH resources need to be multiplexed in TDM between the IAB node and the UE. For this purpose, a subframe number or an SFN offset may be used. The SFN offset may be replaced by setting y' value for the IAB node instead of y of the UE RACH resources, and the subframe number may also be set to a different value for the IAB node. One predetermined value may be used as the SFN offset for the IAB node. Because y=0, 1 for the UE RACH resources, y'=2 to solve the half-duplex problem. It may be assumed that an RACH occasion (subframe number) for the IAB node means one value irrespective of a UE RACH occasion (subframe number). This amount to the assumption that fewer RACHs are required for IAB nodes than for UEs. However, only when there are multiple UE RACH occasions (subframe numbers) and the RACH periodicity of the IAB node is equal to the UE RACH periodicity (x'=1), it may be assumed that the same occasions as the UE RACH occasions (subframe numbers) are available as multiple RACH occasions for the IAB node.

When the RACH configuration of the UE specifies more than one subframe within 10-ms UE RACH resources as RACH resources for the UE, these multiple occasions may not be required for the RACH of the IAB node. This is because resources need to be used efficiently on the assumption that the frequency of RACH occurrences is very small between IAB nodes. Therefore, it may be assumed that only one subframe within 10-ms RACH resources is always RACH resources in an RACH configuration of the IAB node. For this purpose, a specific value may be predetermined for the subframe, or the same subframe number as in the RACH configuration for the UE is used. In the case of multiple occasions, a subframe number set in each configuration may be used. However, it may occur that multiple occasions should be used for the RACH configuration of the IAB node. Therefore, it may be signaled by 1 bit whether only one subframe is assumed to be the RACH resources of the IAB node or the subframes of multiple occasions specified by the RACH configuration of the UE are still used for the IAB node.

When a subframe number offset is set, only one value may be assigned to the IAB node based on the idea that although the RACH resources of the UE may include multiple subframes within 10 ms, the IAB node uses the RACH less often. Let a subframe number of RACH resources for the IAB node be denoted by S. Then, S may range from 0 to 9, and thus the subframe number of RACH resources for the IAB node may be set to one of 0 to 9.

However, when it is assumed that only one subframe is used for RACH resources of the IAB node, latency may occur when the RACH is used for beam coordination. Accordingly, although indexes 0 to 9 are available for the subframe of RACH resources for the IAB node, when the subframe overlaps with at least one subframe of RACH resources for the UE, it may be assumed that the same number of subframes as the subframes of the UE RACH resources (or fewer subframes than the subframes of the UE RACH resources) are used for the RACH resources of the IAB node. However, when the same subframe locations as for the UE are set, the half-duplex problem is not avoidable. Thus, subframes to which a predefined subframe offset is applied may be assumed or other values may be predefined. For example, when subframes 0, 2, 4, 6, and 8 are used for the UE RACH resources and a subframe number for the IAB node is indicated as one of 0, 2, 4, 6, and 8, it may be predefined that subframes 1 and 7 are automatically used for the RACH resources of the IAB node.

The DgNB additionally signals x', y', or a subframe number to the IAB node in the afore-mentioned UE RACH configuration by relaying, for the RACH resources of the IAB node. This RACH configuration is transmitted in SIB1 of RMSI so that the IAB node may receive the RACH configuration.

The above-described x', y', or subframe number may be signaled in a bit field. Because there are 10 subframe numbers, the subframe number is not calculated at a bit level. Further, x' may not be defined at the bit level. Therefore, the subframe number and x' may be signaled in combination at the bit level. For example, when x' ranges from 0 to 5 and the subframe number ranges from 0 to 9, both of x' and the subframe number may be signaled in 6 bits which may represent 60 combinations (=6*10). Considering that separate bit-level signaling of x' and the subframe number requires a total of 7 bits, the joint signaling may reduce the number of signaling bits.

TDM between resources in a UE RACH configuration and an IAB node RACH configuration has been described above. Now, code division multiplexing (CDM) between resources will be described. Basically, TDM is intended to allow a UE and an IAB node to share RACH resources between hops to solve the half-duplex problem between hops, and assign an offset only to the IAB node when different RACH resources are assigned between hops among RACH resources of Rel. 15 and thus there are multiple configuration combinations resulting in overlap between RACH resources. (When an offset is also assigned to a UE, a Rel.15 legacy UE may not identify the offset). Since different Rel. 15 RACH resources are allocated between hops and overlapped RACH resources are not used, the problem may be avoided. In non-overlapped RACH resources, the IAB node may use a different RACH preamble from that of the UE. For example, it may be regulated that all of preambles are not used in the current Rel. 15 RACH resources. Then, the IAB node may be allowed to use an RACH preamble from among the remaining preambles (some preambles available for IAS nodes may be indicated or predefined).

Figure 12:
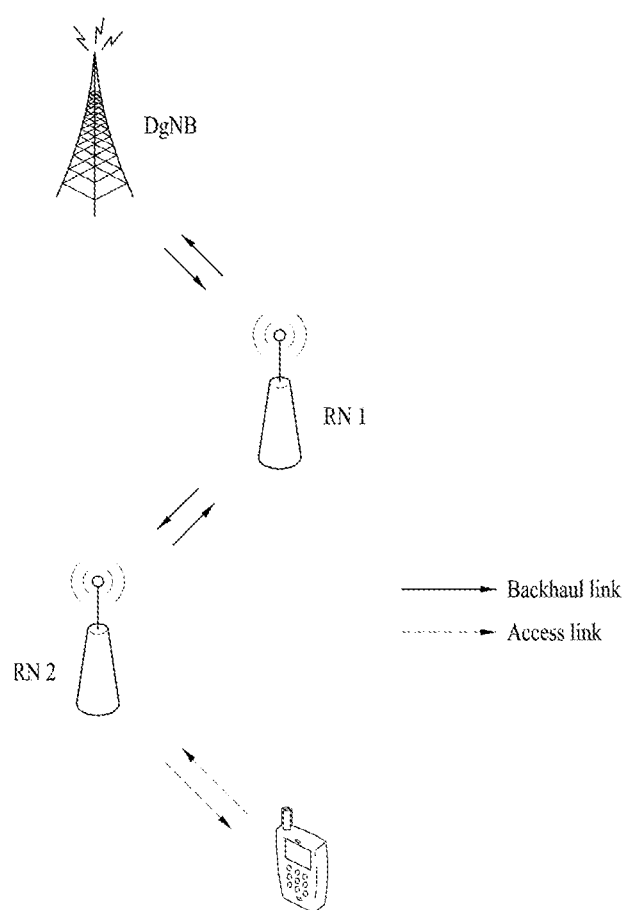
FIGS. 12 and 13 are diagrams illustrating a method of transmitting and receiving a signal according to an embodiment of the present disclosure.

FIG. 12 is a simplified diagram illustrating a DgNB, RNs, and a UE.

Figure 13:
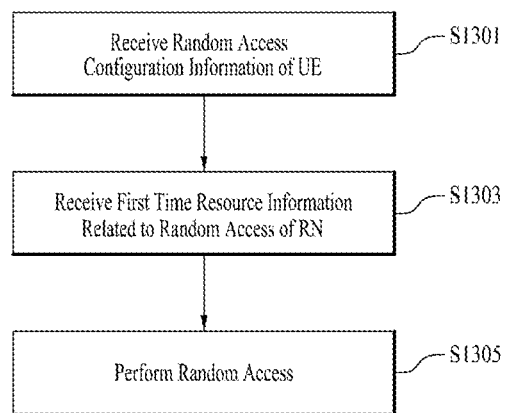

RN1 and RN2 represent IAB nodes as RNs. With reference to FIG. 13, the following description will be given, centering on RN 2, with RN 2 referred to as an RN and RN 1 referred to as a parent RN.

The RN may receive configuration information (hereinafter, referred to as RACH configuration information) related to random access of a UE from its upper node, that is, the DgNB or the parent RN (S1301). The RACH configuration information of the UE may be received directly from the DgNB or through relaying of the parent RN. That is, the RN and the UE may share the same RACH configuration information transmitted from the DgNB.

The RN may receive time resource information related to random access of the RN (hereinafter, referred to as first time resource information) from the DgNB or the parent RN (S1303). The RACH configuration information may include information about frequency resources and time resources for RACH implementation and particularly, a periodicity of random access of the UE and time resource information for a plurality of random access occasions within the periodicity (hereinafter, referred to as second time resource information).

The RN may perform a random access procedure to the DgNB based on the RACH configuration information of the UE and the first time resource information (S1306). The UE may be configured with a plurality of random access occasions within the periodicity for random access of the UE. In contrast, the RN does not need to perform an RACH procedure as often as the UE because the RN has less mobility than the UE. Accordingly, although the RN uses the same RACH configuration information as the UE from the perspective of signaling overhead, the first time resource information may be separately configured for the RN to prevent the RN from performing an unnecessary RACH procedure in time resources. The second time resource information for the random access occasions of the UE may include a plurality of subframes within one period. The first time resource information for a random access occasion of the RN may include one subframe which does not overlap with the plurality of subframes. For example, when specific subframe numbers are configured for random access of the UE, the remaining subframe numbers except for the specific subframe numbers may be configured as time resources for random access of the RN. The first time resource information of the RN may further include offset information which sets a longer periodicity than the periodicity of random access of the UE. For example, it is assumed that one 10-ms radio frame is set as the periodicity of random access of the UE and time resources are configured every 2 ms (e.g., subframe numbers 0, 2, 4, 6, and 8) for a plurality of random access occasions within the periodicity. The first time resource information for the RN may indicate a subframe number which does not overlap with the random access occasions of the UE within the 10-ms periodicity. Further, when the periodicity of random access of the RN is long, for example, longer than that of the UE by four times, the first time resource information may further include offset information '4'.

The RACH configuration information of the UE may be received in RMSI, and the RMSI may include a separate bit field to carry the first time resource information.

The various descriptions, functions, procedures, proposals, methods, and/or operational flowcharts of the present disclosure may be applied to a variety of fields requiring wireless communication/connection (e.g., 5G) between devices.

Hereinafter, a description will be given in more detail with reference to the drawings. In the following drawings/description, the same reference numerals may denote the same or corresponding hardware blocks, software blocks, or functional blocks, unless specified otherwise.

Figure 14:
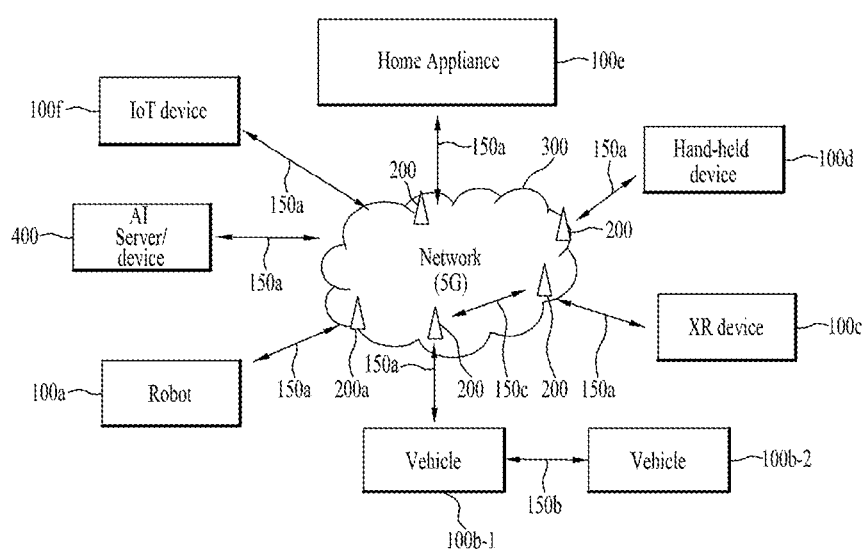
FIG. 14 is a diagram illustrating an exemplary communication system applied to the present disclosure.

FIG. 14 illustrates a communication system 1 applied to the present disclosure.

Referring to FIG. 14, the communication system 1 applied to the present disclosure includes wireless devices, BSs, and a network. When the communication system 1 includes relays, the BSs or wireless devices may be replaced with relays. Herein, the wireless devices refer to devices performing communication by RAT (e.g., 5G NR or LTE), which may also be called communication/radio/5G devices. The wireless devices may include, but no limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing vehicle-to-vehicle (V2V) communication. The vehicles may include an unmanned aerial vehicle (UAV) (e.g., a drone). The XR device may include an augmented reality (AR)/virtual reality (VR)/mixed reality (MR) device, and may be implemented in the form of a head-mounted device (HMD), a head-up display (HUD) mounted in a vehicle, a television (TV), a smartphone, a computer, a wearable device, a home appliance device, a digital signage, a vehicle, a robot, etc. The hand-held device may include a smartphone, a smartpad, a wearable device (e.g., a smartwatch or smart glasses), and a computer (e.g., a laptop). The home appliance may include a TV, a refrigerator, and a washing machine. The IoT device may include a sensor and a smart meter. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as UL/DL communication 150a, sidelink communication 150b (or, D2D communication), or inter BS communication (e.g. relay, IAB). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 15:
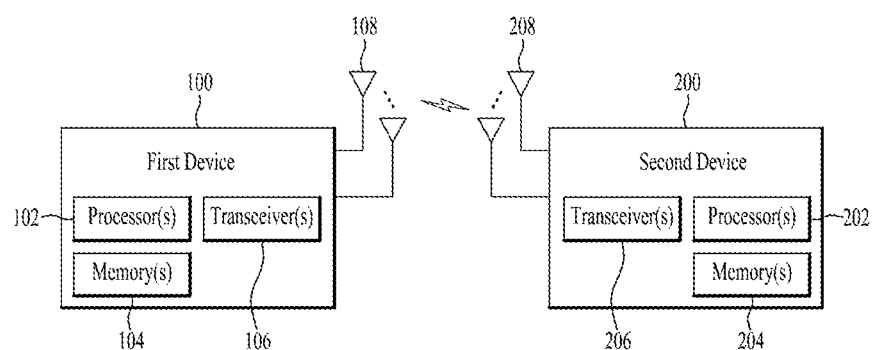
FIG. 15 is a block diagram illustrating an example of wireless devices applicable to the present disclosure.

FIG. 15 illustrates wireless devices applicable to the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with RF unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 16:
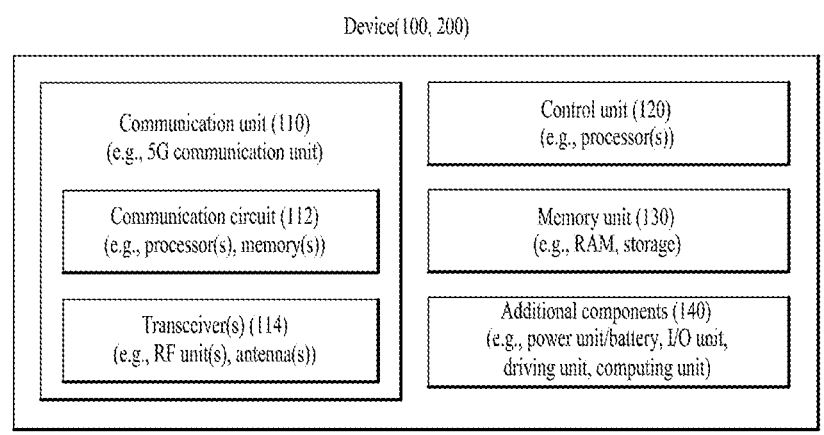
FIG. 16 is a block diagram illustrating another example of wireless devices applicable to the present disclosure.

FIG. 16 illustrates another example of wireless devices applied to the present disclosure. The wireless devices may be implemented in various forms according to a use-case/service (refer to FIG. 14).

Referring to FIG. 16, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (100f of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a random access memory (RAM), a dynamic RAM (DRAM), a read only memory (ROM)), a flash memory, a volatile memory, a non-volatile memory, and/or a combination thereof.

Figure 17:
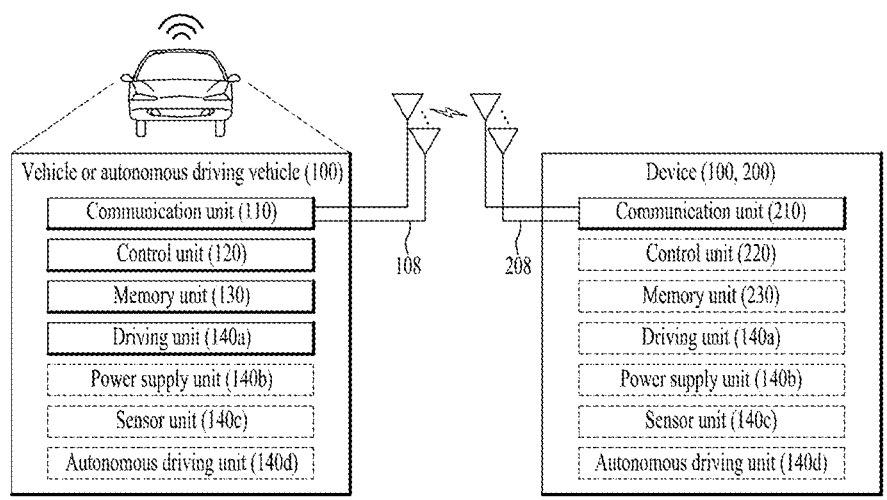
FIG. 17 is a block diagram illustrating a vehicle or an autonomous driving vehicle applicable to the present disclosure.

FIG. 17 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 17, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an electronic control unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment. It is obvious to those skilled in the art that claims that are not explicitly cited in each other in the appended claims may be presented in combination as an embodiment of the present disclosure or included as a new claim by a subsequent amendment after the application is filed.

The embodiments of the present disclosure have been described, centering on a signal transmission and reception relationship between a BS and an MS. This transmission and reception relationship is extended in the same/similar manner to signal transmission and reception between an MS and a relay or between a BS and a relay. A specific operation described as performed by the BS in the present disclosure may be performed by an upper node of the BS under circumstances. That is, it is obvious that various operations performed for communication with an MS in a network comprised of a plurality of network nodes including a BS may be performed by a BS or other network nodes. The term BS may be replaced with the term fixed station, Node B, eNode B (eNB), or access point. Further, the term terminal may be replaced with the term UE, MS, or MSS.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure may be used for a UE, a BS, a relay, or other equipment in a wireless mobile communication system.

The invention claimed is:

1. A method for communicating by an integrated access and backhaul (IAB) node in a wireless communication system, the method comprising:
receiving, from an upper node, configuration information including a periodicity of a random access of a user equipment (UE);
receiving, from the upper node, time resource information related to the random access of the IAB node; and
performing the random access for the upper node based on the periodicity and the time resource information,
wherein the time resource information indicates a weight for the random access of the IAB node, and
wherein the weight satisfies $2^n$, and n is an integer value greater than or equal to 0.

2. The method of claim 1, wherein the random access for the upper node is performed based on a multiplication of the periodicity and the weight.

3. The method of claim 1, wherein the configuration information includes a plurality of subframe numbers for a plurality of random access occasions within the periodicity, and
wherein the time resource information includes one subframe number that does not overlap with the plurality of subframe numbers.

4. The method of claim 1, wherein the configuration information is received in remaining minimum system information (RMSI), and
wherein the RMSI includes a bit field for the time resource information.

5. The method of claim 1, wherein the upper node is a donor base station or a parent node of the IAB node.

6. An integrated access and backhaul (IAB) node in a wireless communication system, the IAB node comprising:
a memory; and
a processor that:
receives, from an upper node, configuration information including a periodicity of a random access of a user equipment (UE);
receives, from the upper node, time resource information related to the random access of the IAB node; and
perform the random access for the upper node based on the periodicity and the time resource information,
wherein the time resource information indicates a weight for the random access of the IAB node, and
wherein the weight satisfies $2^n$, and n is an integer value greater than or equal to 0.

7. The IAB node of claim 6, wherein the random access for the upper node is performed based on a multiplication of the periodicity and the weight.

8. The IAB node of claim 6, wherein the configuration information includes a plurality of subframe numbers for a plurality of random access occasions within the periodicity, and
wherein the time resource information includes one subframe number that does not overlap with the plurality of subframe numbers.

9. The IAB node of claim 6, wherein the configuration information is received in remaining minimum system information (RMSI), and
wherein the RMSI includes a bit field for the time resource information.

10. The IAB node of claim 6, wherein the upper node is a donor base station or a parent node of the IAB node.

11. The IAB node of claim 6, wherein the IAB node includes an autonomous driving vehicle communicable with at least one other autonomous driving vehicle than the upper node and the UE.

12. The method of claim 1, wherein the weight is indicated by one of a value of 1, 2, 4, 8, 16 32, and 64.

13. The IAB node of claim 6, wherein the weight is indicated by one of a value of 1, 2, 4, 8, 16 32, and 64.

* * * * *